US007752092B1

(12) United States Patent
Mattice et al.

(10) Patent No.: US 7,752,092 B1
(45) Date of Patent: Jul. 6, 2010

(54) SYSTEM AND METHOD FOR INDICATING PREVIOUS DOCUMENT SOURCE INFORMATION FOR CURRENT DOCUMENT FIELDS

(75) Inventors: Sara D. Mattice, Farmersville, TX (US); Jennifer L. Reeves, Frisco, TX (US); Pamela R. Welch, Carrollton, TX (US); Laurie A. Irish-Duncan, Plano, TX (US); William W. Huckabee, Sachse, TX (US); James G. Johnson, Fort Worth, TX (US); Kenneth R. Howard, Allen, TX (US)

(73) Assignee: Intuit Inc., Mountain View, CA (US)

( * ) Notice: Subject to any disclaimer, the term of this patent is extended or adjusted under 35 U.S.C. 154(b) by 364 days.

(21) Appl. No.: 11/454,401

(22) Filed: Jun. 16, 2006

(51) Int. Cl.
*G06F 17/22* (2006.01)
*G07F 19/00* (2006.01)

(52) U.S. Cl. .................... 705/30; 705/31; 715/764; 717/170

(58) Field of Classification Search .............. 705/30, 705/31, 1; 707/203, 100, 200, 204, 3, 201, 707/101; 703/22; 717/110, 109, 100, 170; 715/764, 224, 753, 221, 227, 781, 779, 146, 715/139
See application file for complete search history.

(56) References Cited

U.S. PATENT DOCUMENTS

| 5,157,763 | A  | * | 10/1992 | Peters et al. | 715/769 |
|---|---|---|---|---|---|
| 5,603,027 | A  | * | 2/1997 | Ohkami | 707/200 |
| 5,608,898 | A  | * | 3/1997 | Turpin et al. | 707/201 |
| 5,640,501 | A  | * | 6/1997 | Turpin | 715/224 |
| 5,740,405 | A  | * | 4/1998 | DeGraaf | 703/22 |
| 5,745,712 | A  | * | 4/1998 | Turpin et al. | 715/763 |
| 6,662,186 | B1 | * | 12/2003 | Esquibel et al. | 707/101 |
| 7,076,491 | B2 | * | 7/2006 | Tsao | 707/100 |
| 7,134,092 | B2 | * | 11/2006 | Fung et al. | 715/779 |
| 7,266,595 | B1 | * | 9/2007 | Black et al. | 709/223 |
| 2003/0036912 | A1 | * | 2/2003 | Sobotta et al. | 705/1 |
| 2003/0061131 | A1 | * | 3/2003 | Parkan, Jr. | 705/30 |

(Continued)

OTHER PUBLICATIONS

Bruno, Teri. (Oct. 18). BT&T Consumer Technology launches Taxdollars 1995. Business Wire,(1) 1. Retrieved Feb. 26, 2010, from Business Dateline.*

(Continued)

*Primary Examiner*—Matthew S Gart
*Assistant Examiner*—Olusegun Goyea
(74) *Attorney, Agent, or Firm*—Osha • Liang LLP

(57) ABSTRACT

System and method for accessing and displaying previous financial return information in financial return preparation programs. For example, historical tax return information for a taxable entity may be used in the preparation of a current tax return, and some of this information or data may be transferred into a current tax return electronic document, or used in the calculation of a value for a field in a current tax return document. Embodiments may provide a mechanism that enables the preparer to "jump" from a current financial return electronic document, or field on a current electronic document, that is being prepared using a current program to an electronic document prepared using a previous program, and that thus allows the preparer to directly view the source of transferred information or data. Embodiments may thus allow the preparer to identify the specific sources of transferred data or information.

18 Claims, 14 Drawing Sheets

U.S. PATENT DOCUMENTS

| | | | |
|---|---|---|---|
| 2003/0130999 A1* | 7/2003 | Probert et al. | 707/3 |
| 2003/0202012 A1* | 10/2003 | Kemp | 345/762 |
| 2004/0066411 A1* | 4/2004 | Fung et al. | 345/781 |
| 2006/0075398 A1* | 4/2006 | Bennett et al. | 717/170 |
| 2006/0155632 A1* | 7/2006 | Cherkas et al. | 705/36 R |
| 2006/0178961 A1* | 8/2006 | Stanley et al. | 705/31 |
| 2006/0218541 A1* | 9/2006 | Saito | 717/146 |
| 2007/0033117 A1* | 2/2007 | Murray | 705/31 |

OTHER PUBLICATIONS

Reigstad, Maryanne. (Jan. 1986). Area Professionals Mobilize to Handle Annual Tax Crunch. Business First: s1, 2(13), 21. Retrieved Feb. 26, 2010, from Business Dateline.*

* cited by examiner

US 7,752,092 B1

SYSTEM AND METHOD FOR INDICATING PREVIOUS DOCUMENT SOURCE INFORMATION FOR CURRENT DOCUMENT FIELDS

BACKGROUND

Tax preparation software programs (hereinafter referred to as "tax programs") are available from various vendors that assist users in preparing accurate Federal and/or State income tax returns and other tax forms. These tax programs may guide the user through income, property, sales, or other types of tax return processes for a governmental entity or agency (e.g., Federal, State, county, city, district, or other municipality) step-by-step, and may automatically perform necessary tax preparations in accordance with user-entered data input, forms, schedules, and tax data, tables, and formulas stored with or coded into the program. Personal and/or business tax programs may be provided. In addition, both personal and professional versions of these programs may be offered. Professional versions may be used by tax preparation professionals to prepare various tax returns for multiple customers. Further, these tax programs may be used to prepare annual taxes, quarterly taxes, etc.

Tax programs typically include electronic tax documents, the various forms, schedules, worksheets, etc. needed to prepare and file tax returns, which may be stored and accessed as electronic documents. For example, Federal tax return documents that may be provided may include, but are not limited to, 1040, 1040A, 1040EZ, 1040NR, and 1040X forms. In addition, various tax forms and schedules for various States may be included. These electronic tax return documents may be graphically presented by the tax program to the tax preparer on a display device (e.g., a computer monitor). Typically, the tax program will provide a user interface with various user interface elements (menus, dialog boxes, etc.) and user-selectable interface items (menu items, buttons, controls, text entry boxes, etc.) whereby the preparer may access the electronic documents as needed and enter and/or modify data on the various tax documents using one or more data entry/cursor control mechanisms, such as a keyboard and mouse. Typically, these electronic documents are presented on the user interface as templates that, when partially or completely filled out, may be "saved" for the particular taxable entity for which the documents are prepared. Typically, the preparer will enter the necessary data and information to the documents via the user interface, and, when done, access the user interface to direct the tax program to complete the preparation of the tax documents. When done, and possibly verified, the tax return is complete. The completed tax return may be saved, may be printed, or in some cases may be electronically transferred to one or more specified destinations (e.g., via e-mail or other mechanisms used to electronically transfer data).

Instead of or as an alternative to entering the necessary data and information directly to the electronic tax return documents (e.g., directly to a 1040 form), some implementations of tax programs may provide an input mechanism whereby the user inputs the necessary data and information into input fields on data entry displays presented to the user by the tax program. Data and information entered by the user via the input fields may then be automatically transferred into the appropriate locations on the tax return documents. The tax program may perform any necessary calculations using the entered data and information, and possibly data and information from other sources such as previous tax returns, to generate appropriate calculated values for certain fields of the tax return documents.

Federal and State tax laws tend to change frequently. Thus, tax program vendors typically release new versions of their programs that are configured specifically to meet the current Federal and/or State tax requirements. For example, a vendor may release a version of their tax program that is specifically configured to prepare annual income tax returns for the year 2004, and another version of their tax program that is specifically configured to prepare annual income tax returns for the year 2005.

In some cases, historical tax return information or data for the user (e.g., tax return information or data from a previous year) may be used in preparation of a current tax return. In addition, some tax return information or data may be transferred from one current electronic tax document to another current electronic tax document. For example, information or data from a current Federal 1040 form may be transferred to a current State tax return form.

SUMMARY

Various embodiments of a system and method for accessing and displaying previous tax return information in tax preparation software programs (hereinafter referred to as tax programs) are described. Tax programs may guide the user through income, property, sales, or other type of tax return processes for a governmental entity step-by-step, and may automatically perform necessary tax preparations in accordance with user-entered data input, forms, schedules, and tax data, tables, and formulas stored with or coded into the program. Note that tax returns may be part of a broader class of financial returns. Financial returns may be defined as sets of one or more documents that may be prepared according to the requirements or at the request of some governmental entity for a specified reporting period. Therefore, "tax program" is used herein as an example of the broader class of financial return preparation programs, and "tax return" is used herein as an example of the broader class of financial returns.

Historical tax return information or data (e.g., tax return information or data from a previous year, previous quarter, etc.) for a person, business, or other entity (hereinafter referred to collectively as taxable entities) may be used in the preparation of a current tax return, and some of this information or data may be transferred into an electronic document of a current tax return, or used in the calculation of a value for a field in an electronic document of a current tax return. When information or data is transferred by the tax program from a previous tax return to an electronic document of a current tax return, the preparer may have questions as to where certain data or information displayed in the electronic document came from. Embodiments may provide a mechanism or mechanisms that enable the preparer to "jump" from an electronic document of a current tax return that is being prepared using a current tax program, or from a field on an electronic document of a current tax return, to a previous tax program, and that thus allow the preparer to directly view the source of transferred information or data. Providing a mechanism for the preparer to jump from an electronic document or field on an electronic document in a current tax program back to the relevant information in a previous tax return prepared using a previous tax program may allow the preparer to identify the specific sources of transferred data or information.

A current tax program may be installed and executed on a computer system. A preparer may execute tax program to prepare a current tax return for a taxable entity. Upon initiation of preparation of a current tax return for a taxable entity, the tax program may provide a mechanism or mechanisms via which the preparer may transfer at least a portion of previous tax return information for use in relevant places of the electronic documents of a current tax return that is being prepared. The tax program may provide a user interface to guide or step the preparer through one or more electronic documents(s) to prepare the current tax return. These electronic documents may be presented to the preparer on a display device, and the tax program may provide a data entry mechanism with a user interface that allows the preparer to enter and/or modify current data and information in various fields of the electronic documents(s).

Note that electronic documents of a tax return may be referred to herein as "tax electronic documents" or simply as "electronic documents." Further note that electronic documents of a tax return as described herein are intended to include both tax return documents (e.g., 1040, 1040A, 1040EZ, 1040NR, and 1040X forms of a Federal tax return) and data entry displays that include input fields for entering data and information to be transferred into tax return documents. Further, note that electronic documents as used herein may also include other types of electronic documents used in the preparation of tax returns, including but not limited to other electronic documents that are or were used as sources for data and/or information in current or previous tax returns. An example would be an electronic W-2 Form, but other financial and non-financial electronic documents may also be used as source documents for preparing tax returns, and are also intended to be included.

As previously mentioned, instead of or as an alternative to entering the necessary data and information directly to the tax return documents (e.g., directly to a 1040 form), some implementations of tax programs may provide an input mechanism whereby the user inputs necessary data and information into input fields on data entry displays presented to the user by the tax program. Note that data and/or information from other sources, including data and/or information from a previous tax return, may be transferred into or used in the calculation of values for some fields in the data entry displays. Data and information from the data entry displays may then be automatically transferred into the appropriate locations on the electronic tax return documents. The tax program may perform any necessary calculations using the data and information from the data entry displays, and possibly data and information from other sources such as previous tax returns, to generate appropriate calculated values for certain fields of the tax return documents.

One or more values from previous tax return information may be directly transferred into fields of current tax electronic documents. In addition, some values from the previous tax return information may be used to calculate new values for fields in current tax electronic documents. In one embodiment, mapping information may be used by a current tax program to cross-reference to fields in electronic documents of a previous tax return to facilitate the transferal of values from the previous tax return to the current tax electronic documents.

A preparer may select a field in a current tax electronic document for which the preparer desires to discover the source of the value in the field. In response to preparer interaction with the user interface, the current tax program may access the mapping information to determine the source document(s) of the previous tax return from which the value in the field was transferred or calculated. The current tax program may then use this mapping information to invoke the previous tax program with appropriate instructions to display at least a portion of the tax electronic document(s) from which the value in the selected field was transferred or calculated. The previous tax program may then execute and cause to be displayed at least a portion of the appropriate previous tax electronic documents(s). In one embodiment, appropriate fields of a previous tax electronic document may be highlighted to indicate which fields in the document are sources for the selected value in the current tax document. In one embodiment, calculations or formulas that were used to calculate the value in the field of the current tax document from the value(s) in the previous tax document(s) may be displayed.

In an alternative embodiment, instead of invoking the previous tax program to display previous tax document(s), the current tax program may directly access and display the appropriate previous tax electronic documents(s).

Figure 1:
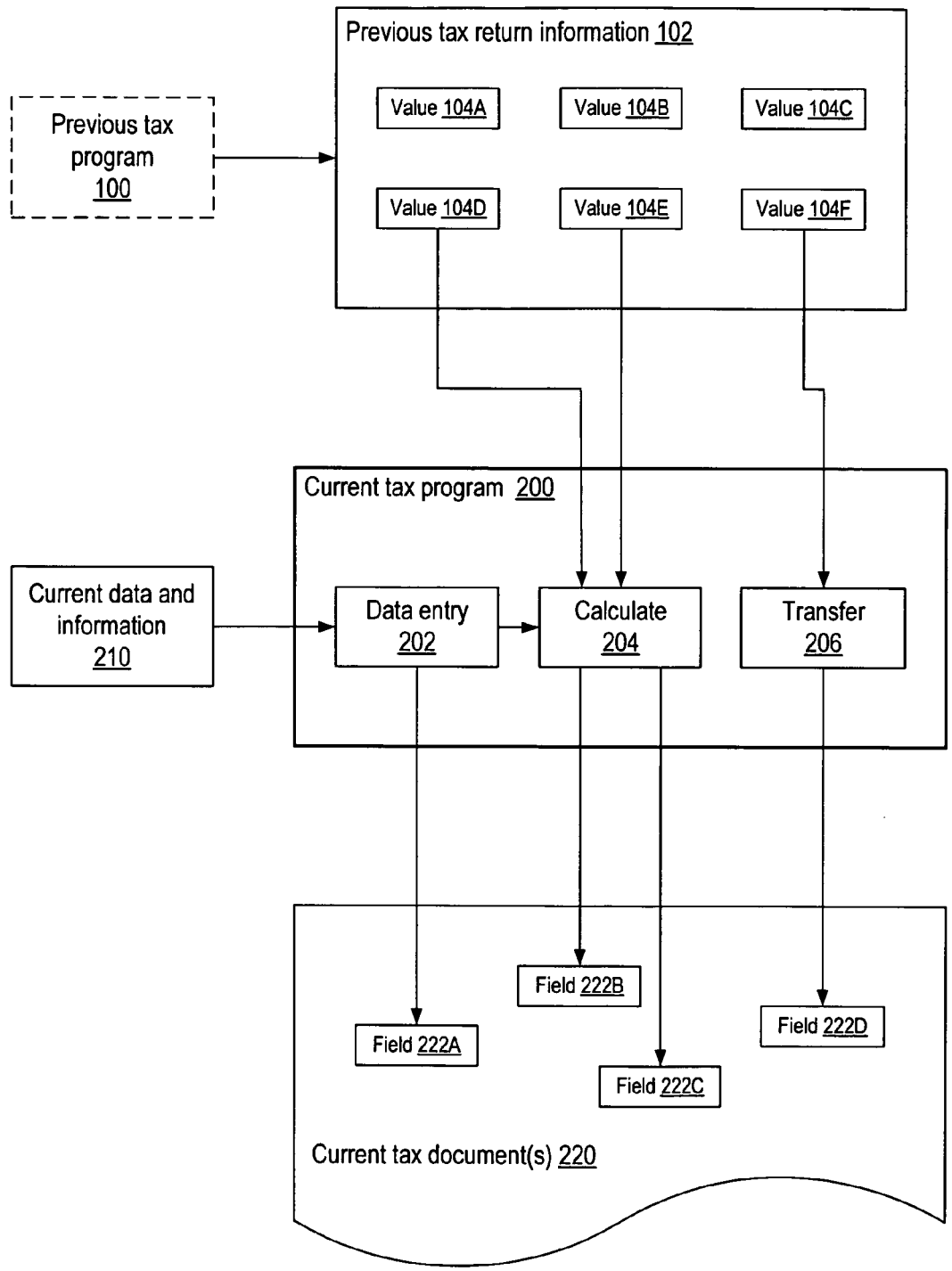
FIG. 1 illustrates exemplary data flow in preparing a tax return using a current tax program and information from a previous tax return according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for accessing and displaying previous tax return information in tax preparation software programs (hereinafter referred to as tax programs) are described. Tax programs may guide the user through income, property, sales, or other type of tax return processes for a governmental entity (e.g., Federal, State, county, city, district, or other municipality) step-by-step, and may automatically perform necessary tax preparations in accordance with user-entered data input, forms, schedules, and tax data, tables, and formulas stored with or coded into the program. Note that tax returns may be part of a broader class of financial returns. Financial returns may be defined as sets of one or more documents that may be prepared according to the requirements or at the request of some governmental entity for a specified reporting period. Note that financial returns may be tax or tax-related returns, or informational returns that are required for reporting purposes but that do not result in or require the payment of any actual taxes. Examples of informational returns may include, but are not limited to, partnership returns and benefit plan returns. Thus, tax programs may be classified as a type of, or function or module of, financial return preparation programs. Therefore, it is important to note that "tax program" is used herein as an example of the broader class of financial return preparation programs, and "tax. return" is used herein as an example of the broader class of financial returns. Thus, the system and method as described herein may be more generally applied for accessing and displaying previous financial return information in financial return preparation programs, with tax programs and tax return preparation is given as an example of a specific application of the system and method.

Historical tax return information or data (e.g., tax return information or data from a previous year or previous quarter) for a person, business, or other entity (hereinafter referred to collectively as taxable entities) may be used in the preparation of electronic documents of a current tax return, and some of this information or data may be transferred into electronic documents of a current tax return, or used in the calculation of values in one or more fields of an electronic document of a current tax return. For example, information or data from a prior-year 1040 form may be transferred to an electronic documents of a current tax return. The information or data that may be transferred may include information for the taxable entity for whom the form is being prepared, e.g. name, address, employment information, dependents, etc., and data values from various fields of the tax return forms, e.g. the prior year's gross or net income from various sources, total taxes, data on assets or liabilities, information on capital gains or losses, depreciation, etc. Note that a similar transfer process may be used for persons, businesses or other entities for which tax returns may be prepared. Some conventional tax programs may be configured to automatically transfer at least some of the needed information or data for a taxable entity to current tax return electronic documents from previous tax return information or data prepared and stored by a previous version of the tax program.

Note that electronic documents of a tax return may be referred to herein as "tax electronic documents" or simply as "electronic documents." Electronic documents of a current tax return may be referred to as "current tax electronic documents" or in some cases "current tax documents", and electronic documents of a previous tax return may be referred to as "previous tax electronic documents" or in some cases "previous tax documents." Further note that electronic documents of a tax return as described herein are intended to include both tax return documents (e.g., 1040, 1040A, 1040EZ, 1040NR, and 1040X forms of a Federal tax return) and data entry displays that include input fields for entering data and information to be transferred into tax return documents. Further, note that electronic documents as used herein may also include other types of electronic documents used in the preparation of tax returns, including but not limited to other electronic documents that are or were used as sources for data and/or information in current or previous tax returns. An example would be an electronic W-2 Form, but other financial and non-financial electronic documents may also be used as source documents for preparing tax returns, and are also intended to be included.

As previously mentioned, instead of or as an alternative to entering the necessary data and information directly to the tax return documents (e.g., directly to a 1040 form), some implementations of tax programs may provide an input mechanism whereby the user inputs necessary data and information into input fields on data entry displays presented to the user by the tax program. Note that data and/or information from other sources, including data and/or information from a previous tax return, may be transferred into or used in the calculation of values for some fields in the data entry displays. Data and information from the data entry displays may then be automatically transferred into the appropriate locations on the tax return documents. The tax program may perform any necessary calculations using the data and information from the data entry displays, and possibly data and information from other sources such as previous tax returns, to generate appropriate calculated values for certain fields of the tax return documents.

When information or data is transferred by the tax program from a previous tax electronic document prepared using a previous version of a tax program to a current tax electronic document being prepared using a current version of a tax program, the preparer (or taxable entity, if not the same person) may have questions as to where certain data or information displayed in the current tax electronic documents came from. Conventionally, the preparer would have to perform manual research to answer these questions. Often, the preparer would call or otherwise contact the provider of the tax program for assistance.

Embodiments may provide a mechanism or mechanisms that enables the preparer to "jump" from a current tax electronic document that is being prepared using a current tax program, or from a field on a current tax electronic document, to a previous tax program, and that thus allow the preparer to directly view the source of transferred information or data. Providing a mechanism for the preparer to jump from an electronic document or field on an electronic document in a current tax program back to the relevant electronic document(s) in a previous tax return prepared using a previous tax program may allow the preparer to identify the specific sources of transferred data or information. The jump mechanism may display the values and calculations that were mapped to a field in a current tax electronic document in a current tax program that includes or was calculated using data values transferred from a tax return prepared using a previous tax program, thus allowing the preparer to determine the source of the data in the field without the need to call or otherwise contact the provider for assistance. In one embodiment, appropriate fields of the previous tax electronic document may be highlighted to indicate which fields in the document are sources for the selected value in the current tax electronic document. In one embodiment, calculations or formulas that were used to calculate the value in the field of the current tax electronic document from the value(s) in the previous tax electronic document(s) may be displayed.

While embodiments are generally described in reference to tax preparation software and in accessing and displaying previous tax electronic documents that are the source of transferred data used in fields of current tax electronic documents, it is important to note that embodiments may be applied to accessing and displaying previous electronic documents that are sources for data used in the preparation of current electronic documents in financial software programs in general or in other types of programs in which data from a previous electronic document is transferred into a current electronic document.

FIG. 1 illustrates exemplary data flow in preparing a tax return using a current tax program and information from a previous tax return according to one embodiment. Current tax program 200 may be installed and executed on a computer system. The computer system may typically be, but is not limited to, a personal computer (PC) such as a desktop computer, laptop, or notebook computer. Alternatively, current tax program 200 may be a network- or web-based tax return preparation program, in which users may prepare various tax electronic documents via a connection to a remote computer system (e.g., a server), without necessarily installing a tax program on their local computer systems (such as a personal computer or laptop).

A preparer may execute tax program 200 to prepare a current tax return for a taxable entity. The taxable entity may be the preparer, or may be another taxable entity for which the preparer is preparing the tax return. Note that the taxable entity may be a person, a business, or other entity for which a tax return is to be prepared. Further note that tax program 200 may be a personal or professional version. Professional versions may be used by tax preparation professionals to prepare various tax returns for multiple customers.

Upon initiation of preparation of a current tax return for a taxable entity, the tax program 200 may provide a mechanism or mechanisms via which the preparer may transfer at least a portion of previous tax return information 102 for use in relevant places of the current tax return that is being prepared. Note that previous tax return information 102 that may be transferred may include textual information, such as the taxable entity's name, address, and other similar information, and data values 104 that were entered into, transferred into, or calculated using a previous tax program 100. In one embodiment, tax program 200 may provide one or more user interface items through which the preparer may select a previous tax return (e.g., last year's return for a particular taxable entity) from which previous tax return information 102 is to be transferred into the current tax return being prepared. As an example, tax program 200 may provide a user-selectable menu option for selecting a previous tax return for a particular taxable entity and transferring the previous tax return information 102 into the current tax return.

Tax program 200 may provide a user interface to guide or step the preparer through one or more electronic documents (current tax document(s) 220 in FIG. 1; e.g. various electronic forms, worksheets, schedules, data entry displays, etc.) to prepare the current tax return. These electronic documents may be presented to the preparer as templates on a display device, and the tax program 200 may provide a data entry 202 mechanism with a user interface that allows the preparer to enter and/or modify current data and information 210 in various fields of the current tax document(s) 220. Note that current tax document 220 is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents.

One or more of the values 104 from previous tax return information 102 may be directly transferred into fields 222 of current tax document(s) 220. For example, in FIG. 1, value 104F is shown as being transferred directly into field 222D. Some values 104 from previous tax return information 102 may be used to calculate 204 new values for other fields 222 in current tax document(s) 220. Note that inputs to a particular calculation to generate a new value for a field 222 may include one or more values from one or more sources. For example, a calculation may be performed that uses just one value 104 from previous tax return information 102 as input. As another example, a calculation may be performed that uses two or more values 104 from previous tax return information 102. As another example, a calculation may be performed that uses one or more values 104 from previous tax return information 102 and one or more values provided by the preparer through the data entry 202 user interface. In addition, calculated values may be used as input into other calculations. Also note that some values used in calculations may be coded as "constants" into the tax program 200, or alternatively may be read into the tax program from a stored data file as needed.

Figure 2:
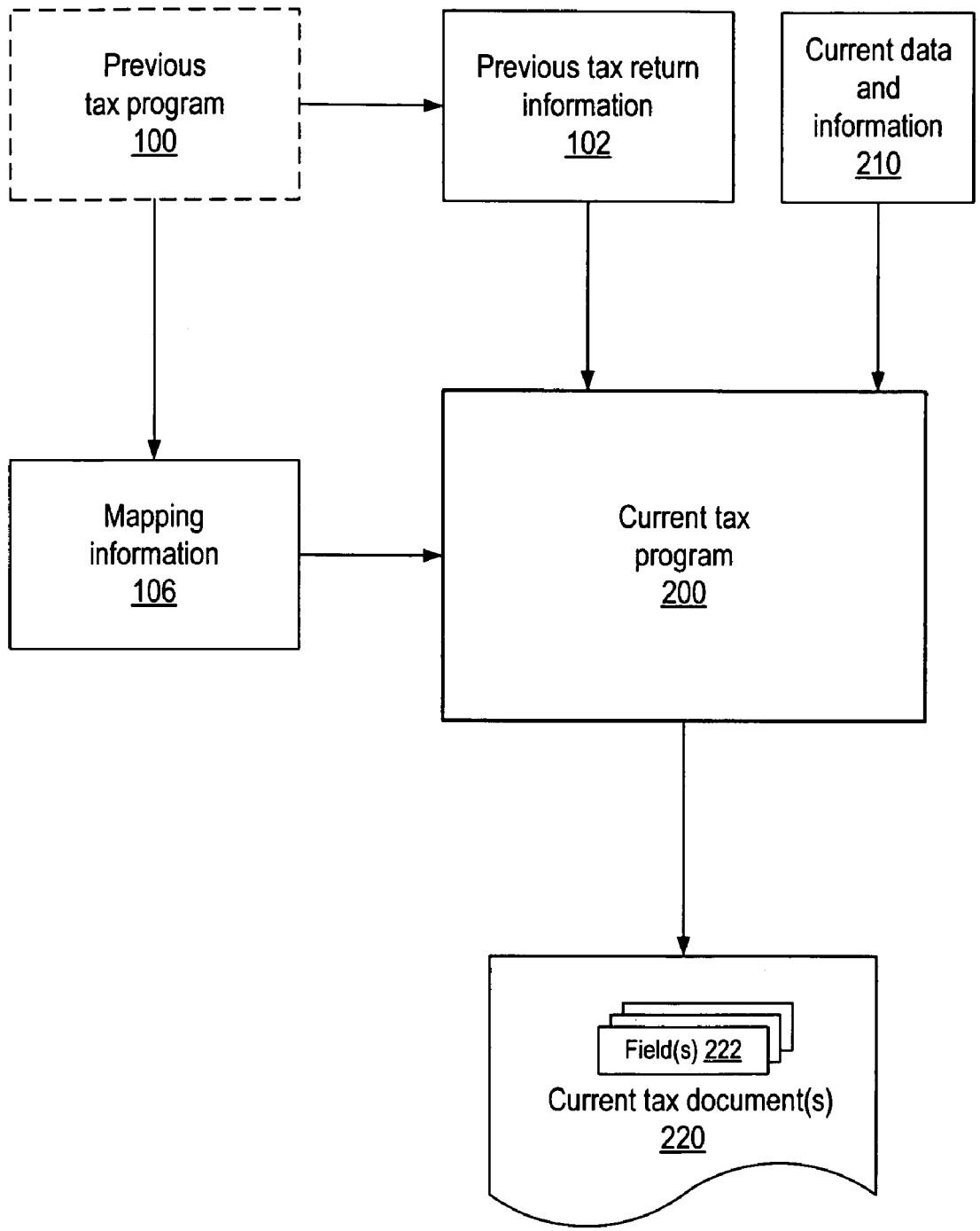
FIGS. 2A and 2B illustrate accessing and displaying previous tax return information from a current tax program according to one embodiment.
Figure 2B:
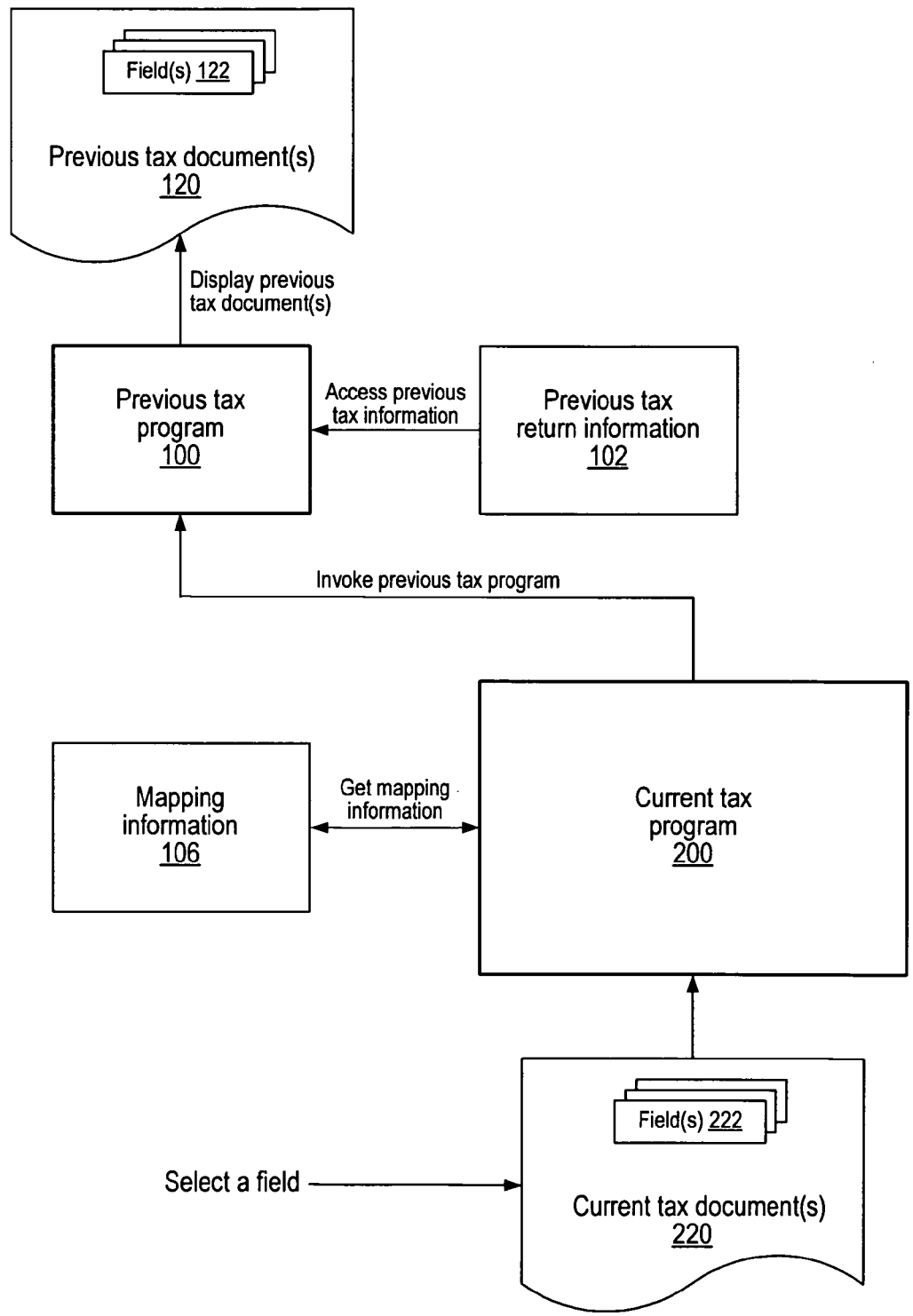

FIGS. 2A and 2B illustrate accessing and displaying previous tax return information from a current tax program according to one embodiment. FIG. 2A illustrates preparing a tax return using a current tax program and information from a previous tax return according to one embodiment. Current tax program 200 may be installed and executed on a computer system. A preparer may execute tax program 200 to prepare a current tax return for a taxable entity. Upon initiation of preparation of a current tax return for a taxable entity, the tax program 200 may provide a mechanism or mechanisms via which the preparer may transfer at least a portion of previous tax return information 102 for use in relevant places of the current tax return that is being prepared. Tax program 200 may provide a user interface to guide or step the preparer through one or more current tax document(s) 220 to prepare the current tax return. These documents may be presented to the preparer as templates on a display device, and the tax program 200 may provide a data entry mechanism with a user interface that allows the preparer to enter and/or modify current data and information 210 in various fields of the current tax document(s) 220. Note that current tax document 220 is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents.

One or more values from previous tax return information 102 may be directly transferred into fields 222 of current tax document(s) 220. In addition, some values from previous tax return information 102 may be used to calculate new values for fields in current tax document(s) 220. In one embodiment, mapping information 106 may be used by current tax program 200 to cross-reference to fields in previous tax electronic documents generated by previous tax program 100 to facilitate the transferal of values from the previous tax return to the current tax document(s) 220. Mapping information 106 may, for example, have been generated by previous tax program 200 when generating the previous tax return; Mapping information 106 may include information that maps particular fields to particular electronic documents in the previous tax return.

FIG. 2B illustrates "jumping back" from a current tax return document prepared by a current tax program to a previous tax document that is the source of the value in a field of the document, according to one embodiment. A preparer may select a field 222 in a current tax document 220 for which the preparer desires to discover the source of the value in the field. Various user interface mechanisms for making such a selection are described below. In response to preparer interaction with the user interface, the current tax program 200 may access mapping information 106 to determine the source electronic document(s) of the previous tax return from which the value in the field was transferred or calculated. Current tax program 200 may then use this mapping information 106 to invoke previous tax program 100 with appropriate instructions to display at least a portion of the document(s) from which the value in the selected field 222 was transferred or calculated. Previous tax program 100 may then execute and cause to be displayed the appropriate previous tax document(s) 120. Note that previous tax program 100 may access previous tax return information 102 to display the appropriate tax document(s) 120, if necessary.

In an alternative embodiment, instead of invoking previous tax program 100 to display previous tax document(s) 120, current tax program 200 may directly access and display the appropriate previous tax document(s) 120.

Figure 3:
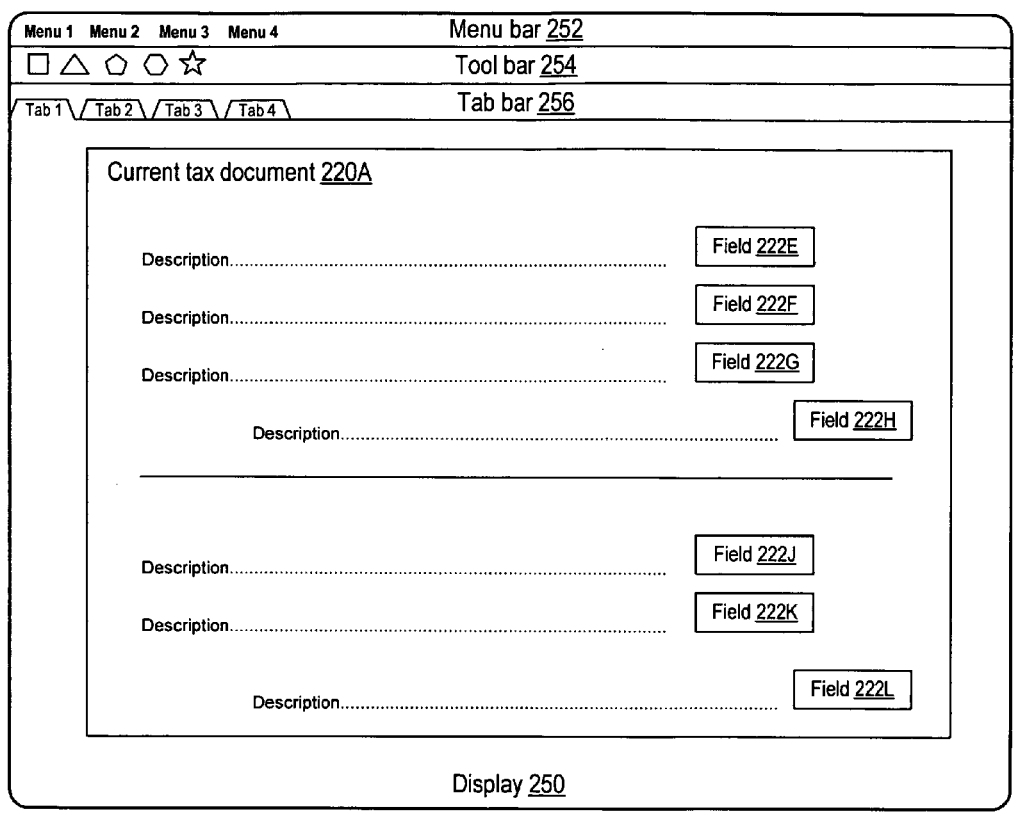
FIG. 3 illustrates an exemplary, generic display and user interface that may be provided by a tax program according to one embodiment.

FIG. 3 illustrates an exemplary, generic display and user interface that may be provided by a tax program 200 according to one embodiment. Display 250 may include one or more of, but is not limited to, a menu bar 252, a tool bar 254, and a tab bar 256. Menu bar 252 may provide one or more menus for accessing various functionalities of tax program 200 via user-selectable interface items (menu selections). Tool bar 254 may provide one or more tool icons for accessing various tools of tax program 200. Tab bar 256 may provide one or more tabs for switching between various views presented to the tax preparer. The currently selected tab displays a current tax document 220A. Note that current tax document 220A is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents.

Current tax document 220A may include multiple fields 222. Values in these fields 222 may include values entered by the preparer via the user interface, values transferred from a previous tax return (previous tax return information 102 in FIG. 1), or calculated values. Calculated values may be calculated from one or more other values, including values transferred from a previous tax return and values entered by the preparer via the user interface. Further, calculated values displayed in one field 222 may be used in calculating a value for another field 222.

Figure 4A:
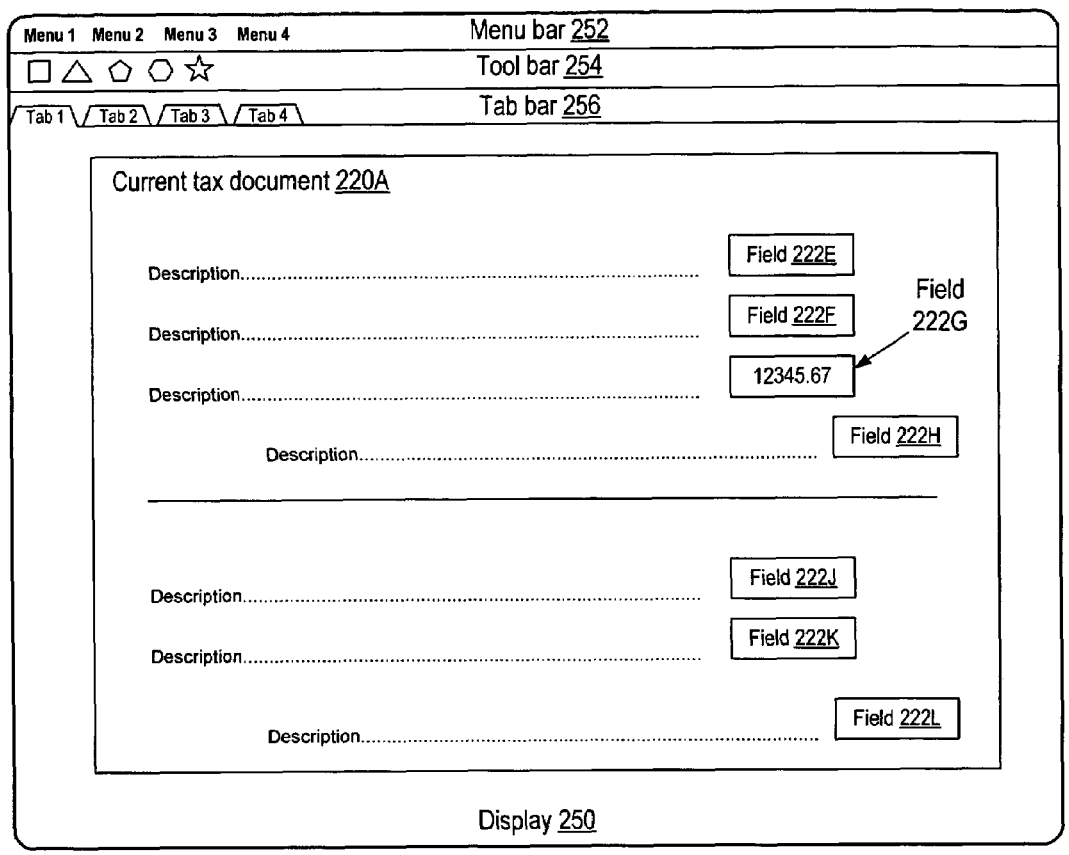
FIG. 4A illustrates the display of FIG. 3 with a field including a value according to one embodiment.

When preparing an electronic document such as document 220A, the preparer may have questions as to where a certain value displayed in one of the fields 222 came from. The value, for example, may be a value transferred from an electronic document of a previous tax return, or calculated using one or more input values from an electronic document of a previous tax return. The description of the field 222 may provide some information, but may not provide enough information to satisfy the preparer. As an example, FIG. 4A illustrates the display 250A of FIG. 3 with field 222G of current tax document 220A filled in with a value (12345.67 is used as an exemplary value). If the value in field 222G was automatically filled in by the tax program 200, the preparer may be curious as to where the value "12345.67" came from.

Thus, embodiments may provide one or more user interface mechanisms and elements whereby the preparer or other user may select a field and direct the tax program 200 to access and display the appropriate previous tax return information (e.g., one or more tax return documents or portions of the documents from a previous year) for fields that are filled in using transferred previous tax return information 102 or calculated using input values from one or more fields of a previous tax return document. FIGS. 4B through 4E illustrate exemplary user interface mechanisms and elements that may be provided for accessing and displaying previous tax return information for field 222G of document 220A in FIG. 4A (or for other fields 222 in document 220A or on other documents) according to various embodiments. Note that the user interface mechanisms and elements as illustrated and described are exemplary and are not intended to be limiting, and various modifications to or variations of the mechanisms and elements are possible, as are alternative user interface mechanisms and elements that are configured to perform similar functions.

Figure 4B:
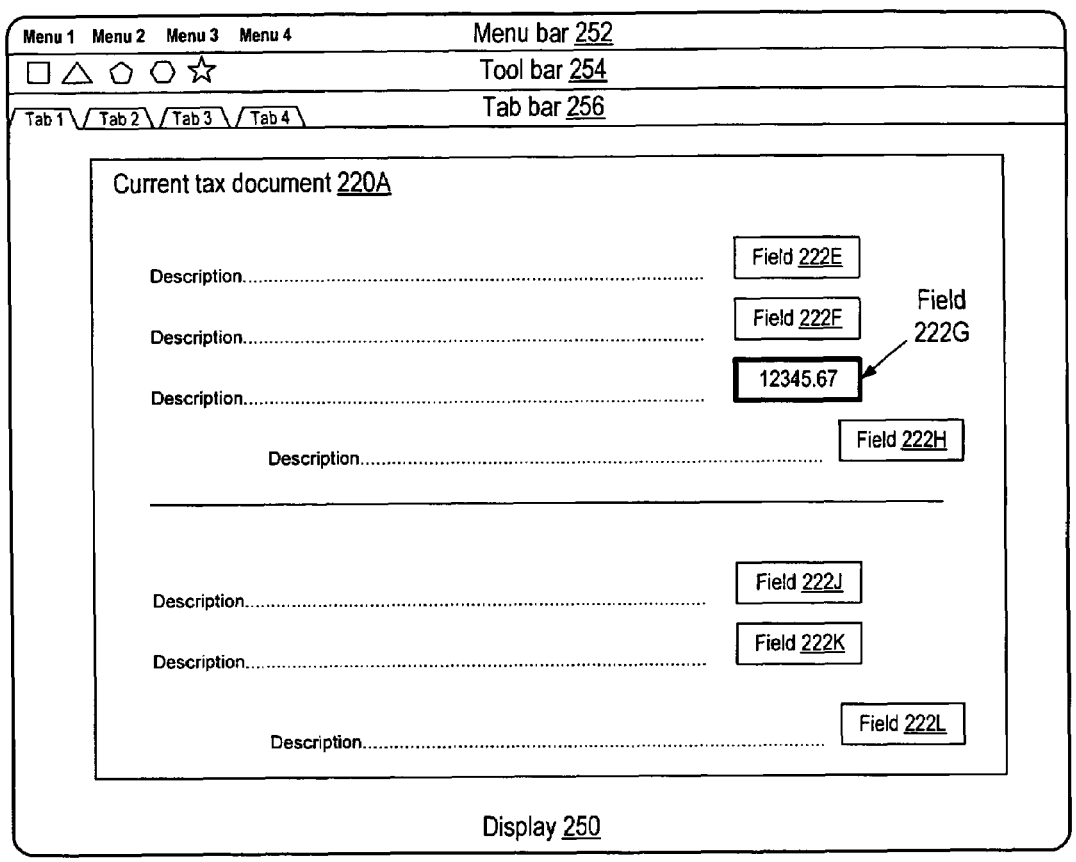
FIGS. 4B through 4E illustrate exemplary user interface mechanisms and elements that may be provided for accessing and displaying previous tax return information for a field in an electronic document of a current tax return according to various embodiments.

In FIG. 4B, the preparer has selected field 222G. The selection of field 222G is illustrated in FIG. 4B by a bold outline or border. One of ordinary skill in the art will recognize that various user interface mechanisms for selecting a field in a document may be used. For example, a preparer may select a field 222G by using a tab or enter key on a keyboard to go to the field 222G. As another example, a mouse or other cursor control device may be used to select a field 222G, for example by selecting the field with a mouse. One of ordinary skill in the art will also recognize that various other user interface methods for highlighting a selected field in a document than bolding an outline or border may be used.

Once selected, tax program 200 may provide one or, more user interface mechanisms and elements for invoking functionality to access and display source information for the selected field 222G. As an example, in one embodiment, a mouse or other cursor control device may have two buttons. In this embodiment, the preparer may right-click the mouse when the cursor is on the field 222G (note that the right-clicking of the cursor control device may also serve to select the field 222G, as described above). In one embodiment, right-clicking on the field 222G may automatically cause the source information for the field from a previous tax return to be accessed and displayed. In one embodiment, right-clicking may cause a pop-up menu, or alternatively a dialog, to be displayed, from which the preparer may select from among one or more options. At least one of the options may be to display source information for the selected field 222G. In another embodiment, once a field 222G is selected, a menu in menu bar 252 may be accessed by the preparer to select a menu item. In one embodiment, selecting the menu item may automatically cause the source information for the field to be accessed and displayed. Alternatively, selecting the menu item may cause a pop-up menu, or alternatively a dialog, to be displayed, from which the preparer may select from among one or more options. At least one of the options may be to display source information for the selected field 222G. Similarly, in another embodiment, one or more of the tool icons in tool bar 254 may be configured to access and display source information for a selected field 222G.

Figure 4C:
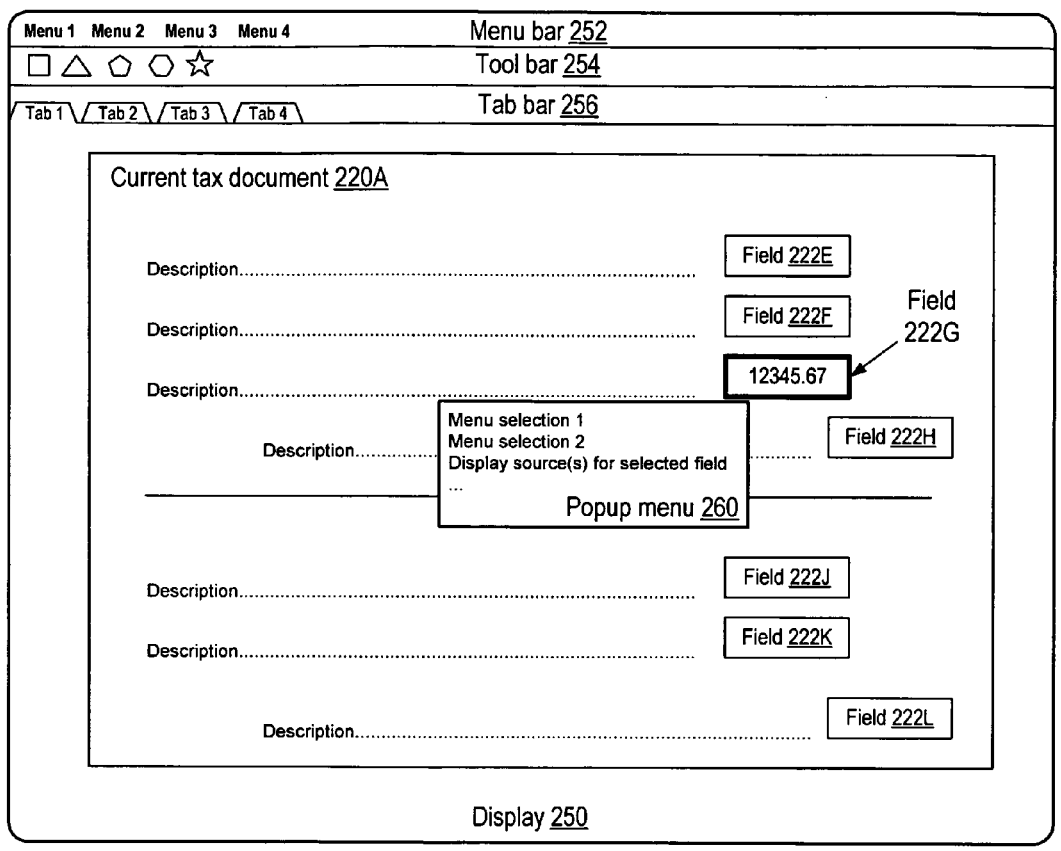

FIG. 4C illustrates an exemplary popup menu with a menu item to display source(s) for the selected field according to one embodiment. A popup menu 260 may be displayed, for example, in response to a right-click on the field 222G. In one embodiment, user selection of the menu item Display source (s) for the selected field may cause one or more appropriate source documents from a previous tax return to be displayed, as is illustrated below in FIG. 5. Note that, in another embodiment, user selection of the menu item Display source(s) for the selected field, instead of causing the source documents to be displayed, may instead cause a dialog box such as dialog box of FIG. 4D to be displayed.

Figure 4D:
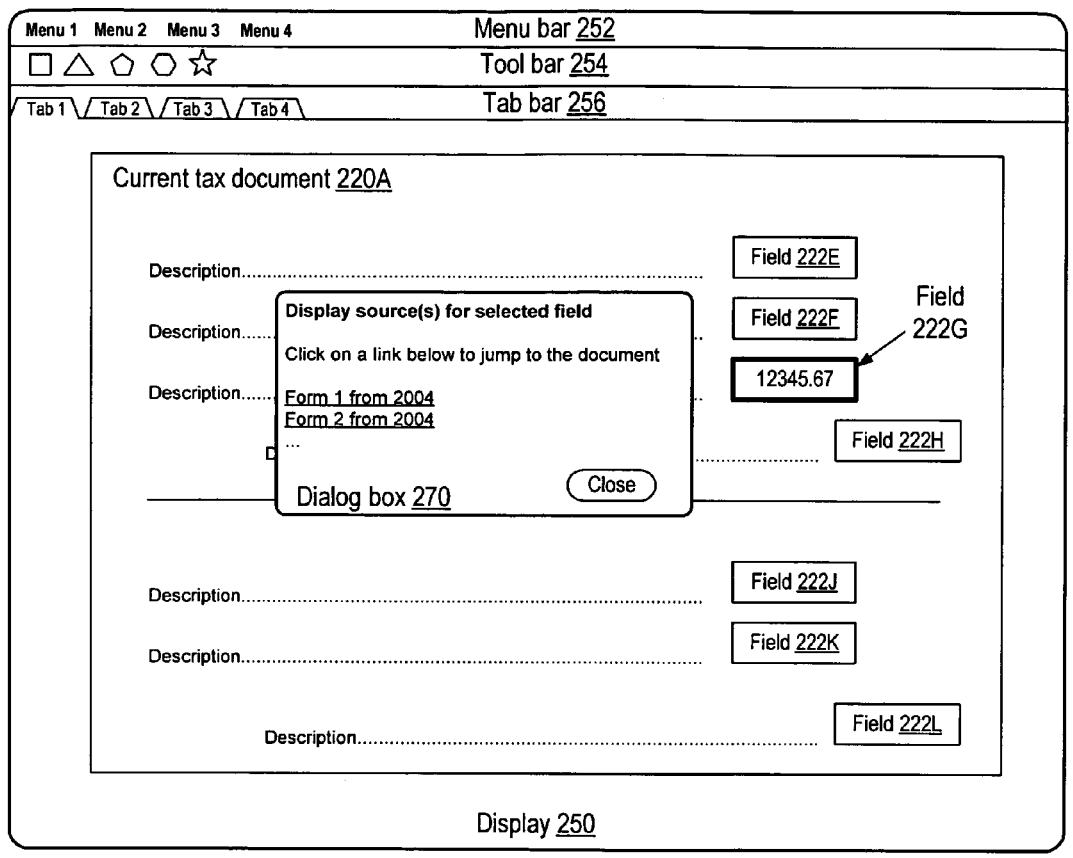

FIG. 4D illustrates an exemplary dialog box with user-selectable interface items to display source(s) for the selected field according to one embodiment. The dialog box 270 may be displayed, for example, in response to a right-click on the field 222G. In one embodiment, user selection of an interface item in the dialog box may cause one or more appropriate documents from a previous tax return to be displayed, as is illustrated below in FIG. 5. The exemplary dialog box 270 of FIG. 4D shows two user-selectable links as the user-selectable interface items, Form 1 from 2004 and Form 2 from 2004. Note that dialog box 270 is exemplary, and one or more electronic documents may be listed as source documents for a field 222. Further note that the names of the tax documents are exemplary; in a tax program, more detailed names may be provided for the tax documents (e.g., "Form 1040 (2004)").

Figure 4E:
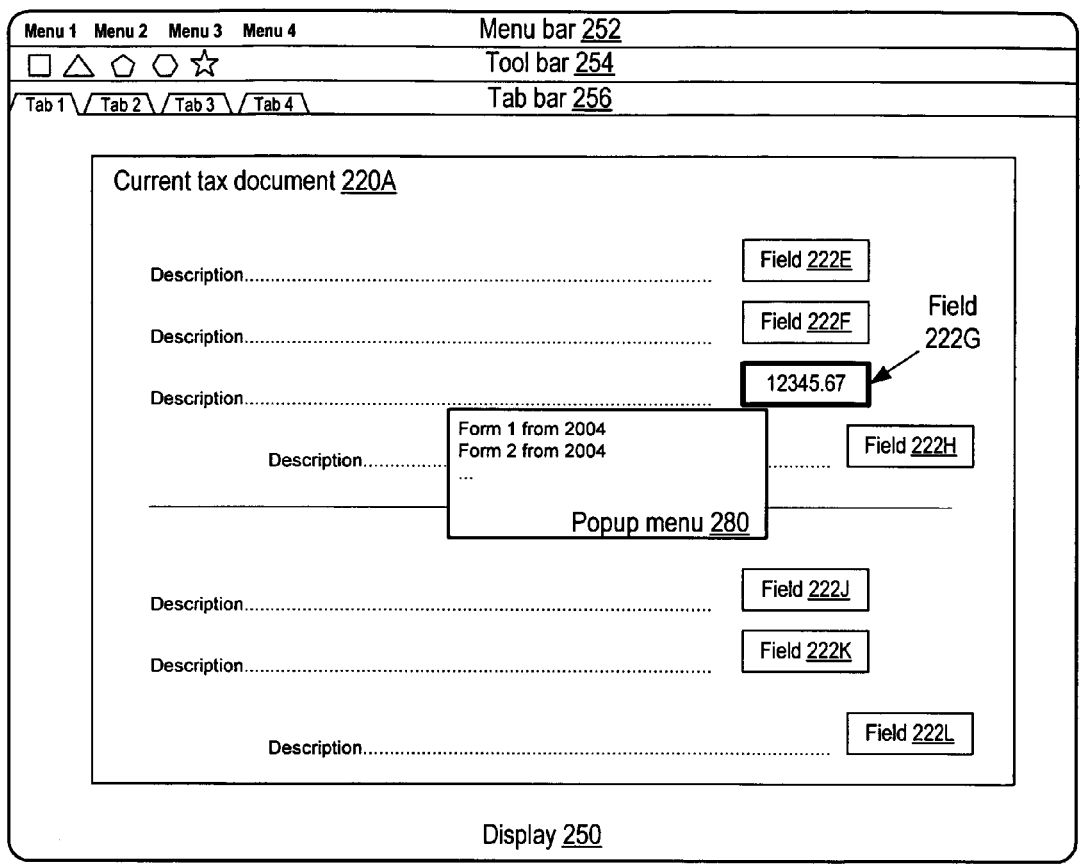

FIG. 4E illustrates an exemplary popup menu with menu item(s) to directly display source documents for the selected field according to one embodiment. A popup menu 280 may be displayed, for example, in response to a right-click on the field 222G. In one embodiment, user selection of a menu item in menu 280 may cause the appropriate document from a previous tax return to be displayed, as is illustrated below in FIG. 5.

One or more mechanisms may be used in embodiments, and different mechanisms may be used in different embodiments, to access and display the appropriate documents from previous tax returns in response to user interaction with a user-selectable interface item such as those illustrated in the exemplary user interfaces of FIGS. 4B through 4E. In one embodiment, the previous tax program (e.g., previous tax program 100 in FIGS. 1 and 2A-2B) may be executed at the direction of the current tax program 200 with appropriate instructions to display one or more appropriate documents from the previous tax return from which a value in a field 222 was transferred. In another embodiment, instead of executing the previous tax program, the current tax program 200 may access and cause to be displayed the appropriate documents from the previous tax return. The documents may be displayed in a window of the current tax program 200, or alternatively in a window of another program. For example, the documents may be stored as PDF documents or documents in some other format (e.g., HTML), and an appropriate program to display documents in that format may be invoked to display the appropriate document(s). Note that, in one embodiment, one or more fields in a displayed document from a previous tax return from which a value in a field 222 was transferred may be highlighted in the displayed document.

Figure 5A:
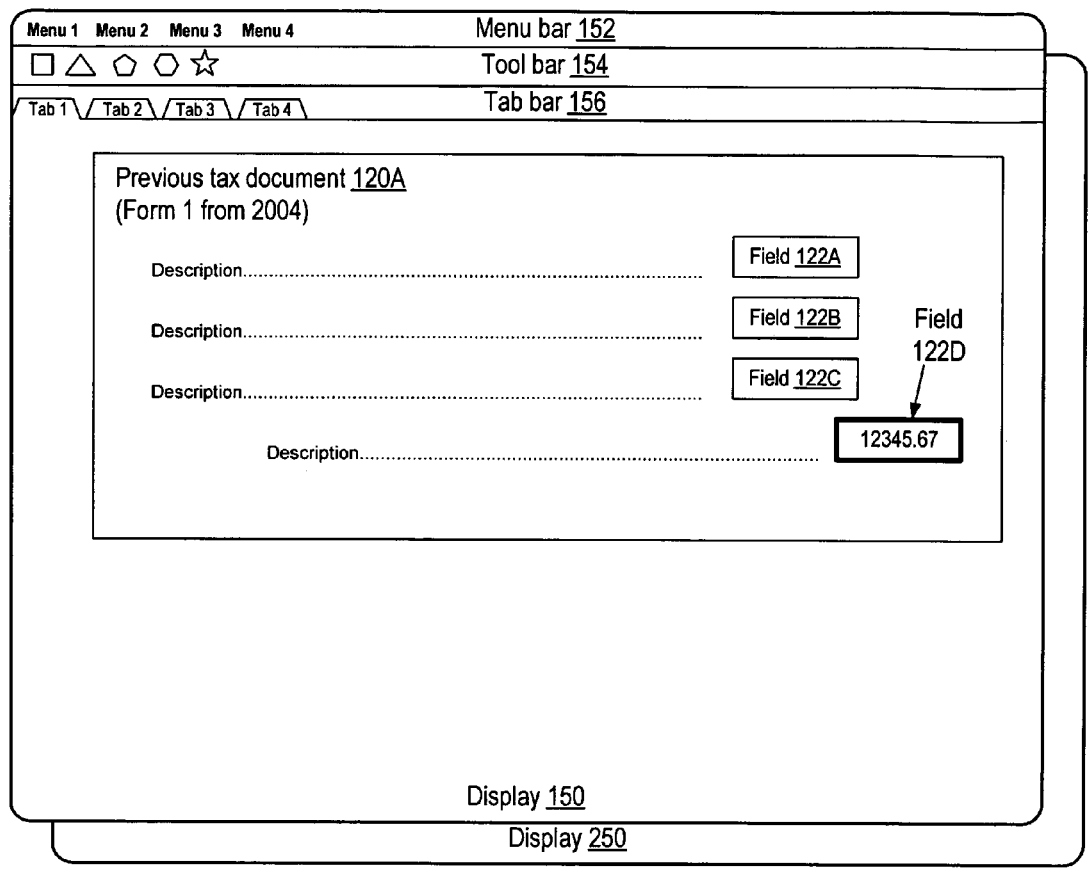
FIG. 5A illustrates displaying at least a portion of an electronic document from a previous tax return by invoking a previous tax program from a current tax program in response to user interaction with one or more user-selectable interface items in the current tax program according to one embodiment.

FIG. 5A illustrates displaying at least a portion of an electronic document from a previous tax return by invoking a previous tax program from a current tax program in response to user interaction with one or more user-selectable interface items in the current tax program according to one embodiment. Display 150 represents a display presented by the previous tax return program, and may be similar to the display 250 described for the current tax program 200 in FIG. 3. Note that, in this example, display 150 is shown as overlaying display 250 on a computer screen by way of example. One of ordinary skill in the art will recognize that other arrangements for the displays are possible.

In display 150, a previous tax document 120A may be displayed that is the source document for the transferred value in field 222G of document 220A in FIGS. 4A through 4E. In one embodiment, a particular field or fields in the previous tax document may be highlighted or otherwise indicated as the source field(s) for the value. In this example, field 122D of document 120A is shown as the source field for the value by a bold outline or border. One of ordinary skill in the art will also recognize that various other user interface methods for highlighting a selected field in a document than bolding an outline or border may be used. In one embodiment, calculations or formulas that were used to calculate the value in the field of the current tax document from the value(s) in the previous tax document(s) may be displayed. Note that, in one embodiment, the previous tax program may be invoked with limited functionality so that the preparer cannot modify the previous tax return. In other words, the previous tax program may be invoked to display the appropriate document(s) only. Also note that previous tax document 120A is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents. Also note that, in one embodiment, a portion or all of previous tax document 120A may be displayed.

In one embodiment, the previous tax program may also be configured with user interface mechanisms similar to the mechanisms described above to display source documents for values in fields of electronic documents of the previous tax return. Thus, in this embodiment, if the preparer is curious as to where a value in field of a displayed electronic document from a previous tax return came from, the preparer may invoke the appropriate user-selectable interface items in the previous tax program to access an even earlier tax return (e.g., via an earlier version of the tax program) and thus display at least a portion of an electronic document from the earlier tax return from which the value was transferred. Thus, embodiments may allow a preparer to trace transferred values back through two or more earlier tax returns. For example, a preparer using a 2005 version of the tax program may jump back to find the source for a transferred value in a 2004 tax return electronic document that was prepared using a 2004 version of the tax program. From the electronic document prepared using the 2004 version of the tax program, the preparer may jump back to find the source for a transferred value in a 2003 tax return electronic document that was prepared using a 2003 version of the tax program, and so on.

Figure 5B:
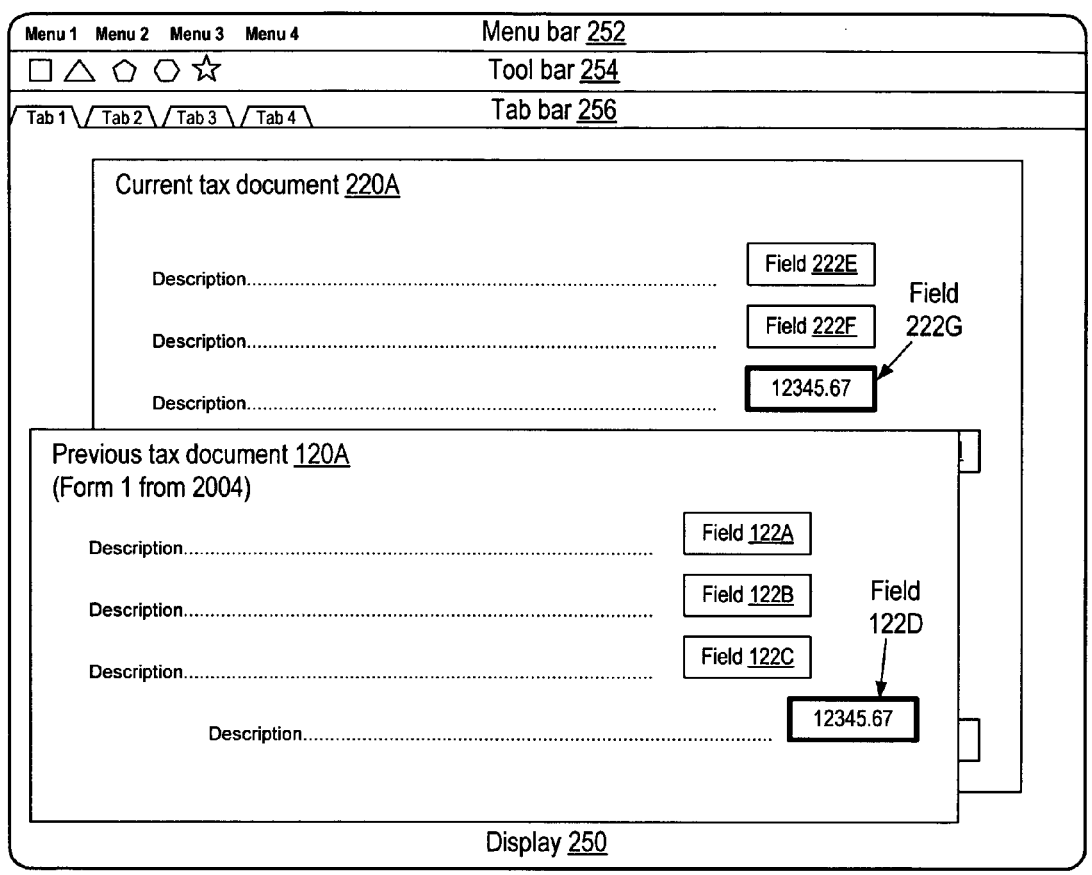
FIG. 5B illustrates displaying at least a portion of an electronic document from a previous tax return in a current tax program in response to user interaction with one or more user-selectable interface items in the current tax program according to one embodiment.

FIG. 5B illustrates displaying at least a portion of an electronic document from a previous tax return in a current tax program in response to user interaction with one or more user-selectable interface items in the current tax program according to one embodiment. In display 250, a previous tax document 120A A may be displayed that is the source document for the transferred value in field 222G of document 220A in FIGS. 4A through 4E. In one embodiment, a particular field or fields in the previous tax document may be highlighted or otherwise indicated as the source field(s) for the value. In this example, field 122D of document 120A is shown as the source field for the value by a bold outline or border. One of ordinary skill in the art will also recognize that various other user interface methods for highlighting a selected field in a document than bolding an outline or border may be used. In one embodiment, calculations or formulas that were used to calculate the value in the field of the current tax document from the value(s) in the previous tax document(s) may be displayed. Note that, in this example, previous tax document 120AA is shown as overlaying current tax document 220A on display 250 by way of example. One of ordinary skill in the art will recognize that other arrangements for displaying two or more tax documents on a computer screen are possible. Also note that previous tax document 120A is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents. Also note that, in one embodiment, a portion or all of previous tax document 120A may be displayed.

Figure 6:
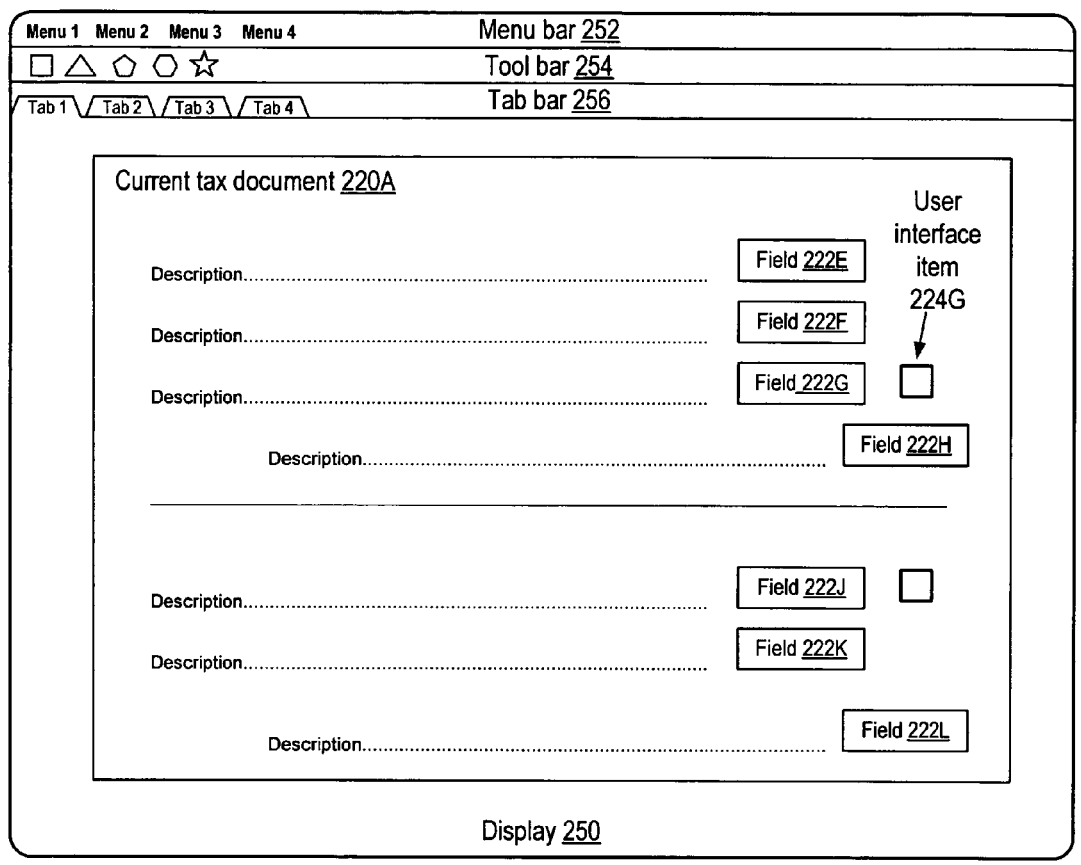
FIG. 6 illustrates an alternative and exemplary display and user interface that includes a user-selectable interface item via which the preparer may direct the tax program to display previous tax document(s) from which a value in a field was transferred or calculated, according to one embodiment.

FIG. 6 illustrates an alternative and exemplary display and user interface that includes a user-selectable interface item via which the preparer may direct the tax program to display previous tax document(s) from which a value in a field was transferred or calculated, according to one embodiment. In this example, one or more of the fields may have an associated user-selectable interface item 224 (e.g., an icon or button) that, when selected by the preparer, for example using a cursor control device such as a mouse, may cause the tax program to display one or more source documents from a previous tax return. Alternatively, selecting a user-selectable interface item 224 may cause a popup menu or dialog, such as those described in FIGS. 4C through 4E, to be displayed, from which the preparer may select from among one or more options, including an option to display a document from a previous tax return. See FIGS. 5A and 5B for examples of displaying a document from a previous tax return. Note that the use of the user-selectable interface item 224 is an alternative to other methods such as right-clicking on a selected field 222. In addition, note that some embodiments may use a combination of two or more different mechanisms for invoking the display of source document(s) from a previous tax return.

Figure 7:
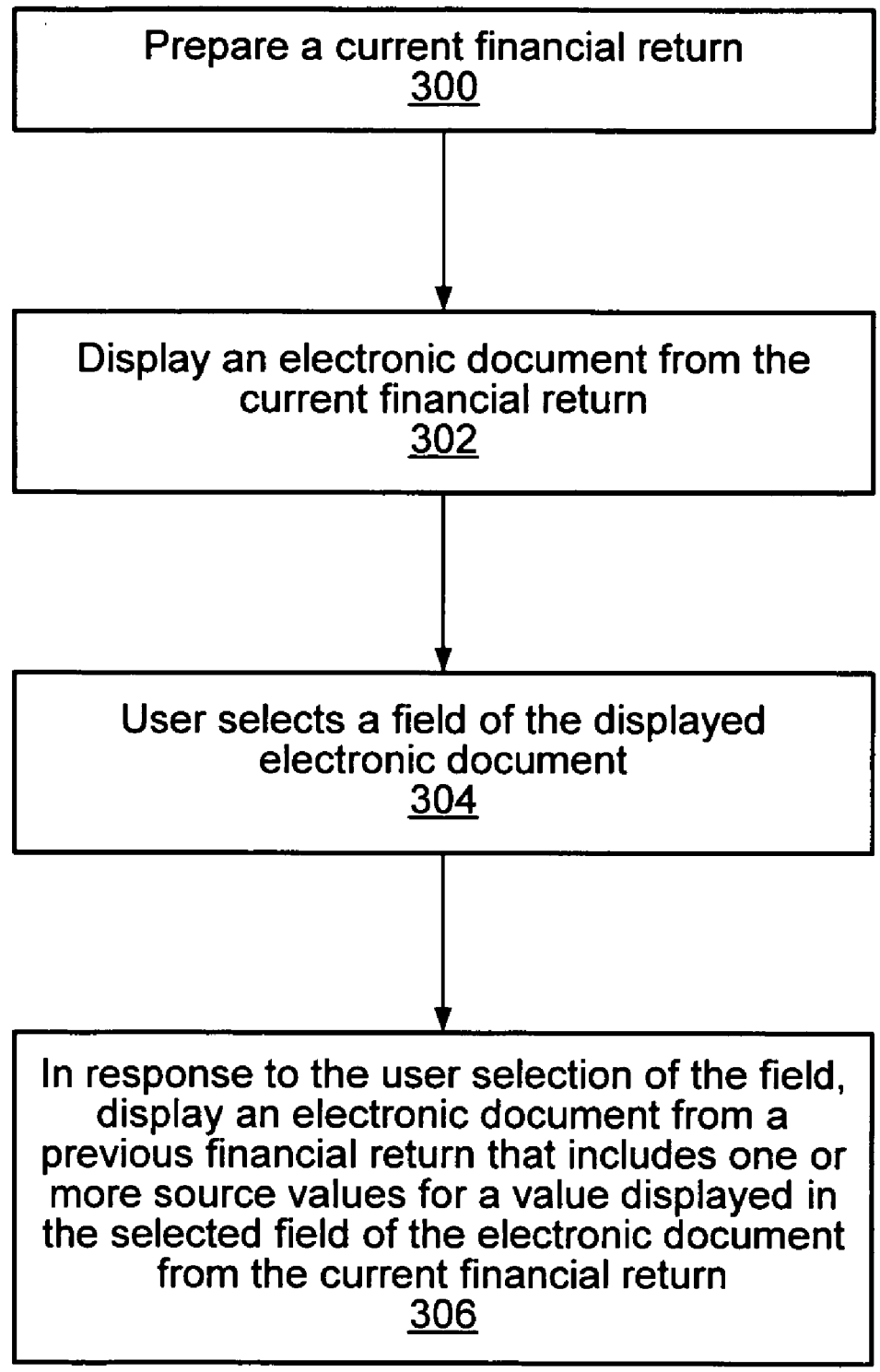
FIG. 7 is a flowchart of a method for accessing and displaying previous financial return information in financial return preparation programs according to one embodiment.

FIG. 7 is a flowchart of a method for accessing and displaying previous financial return information in financial return preparation programs according to one embodiment. Financial returns may be defined as sets of one or more documents that may be prepared according to the requirements or at the request of some governmental entity for a specified reporting period. Financial returns include, but are not limited to, tax returns, as previously described. Financial returns may be tax or tax-related returns, or informational returns that are required for reporting purposes but that do not result in or require the payment of any actual taxes.

As indicated at 300, a preparer may prepare a current financial return using a current version of a financial return preparation program. An electronic document from the current financial return may be displayed on a computer display device, as indicated at 302. The document may include one or more fields that display values. The displayed values may include one or more values that were calculated using values from a previous financial return, or values that were transferred from a previous financial return, which was prepared using a previous version of the financial return preparation program. The user (who may be, but is not necessarily, the preparer of the current financial return) may want to discover the source of one of the values displayed in one of the fields.

To discover the source of a value in one of the displayed fields, the user may select the field in the displayed document, as indicated at 304. In response to the user selection of the field, the current financial return preparation program may cause at least a portion of an electronic document from a previous financial return that includes one or more source values for the value displayed in the selected field to be displayed. In one embodiment, selection of the field (e.g., by right-clicking on the field with a mouse) may cause the document from the previous financial return to be directly displayed. In one embodiment, selecting the field may cause a user interface element to be displayed that includes one or more user-selectable interface items that the user may then select to cause the electronic document to be displayed.

In one embodiment, to display the electronic document from the previous financial return, the current financial return preparation program may invoke the previous financial return preparation program, which will then display at least a portion of the document in accordance with instructions from the current financial return preparation program. In one embodiment, to display the at least a portion of the document from the previous financial return, the current financial return preparation program may access a stored copy of the document and directly display the at least a portion of the document without invoking the previous version of the financial return preparation program.

Exemplary System

Figure 8:
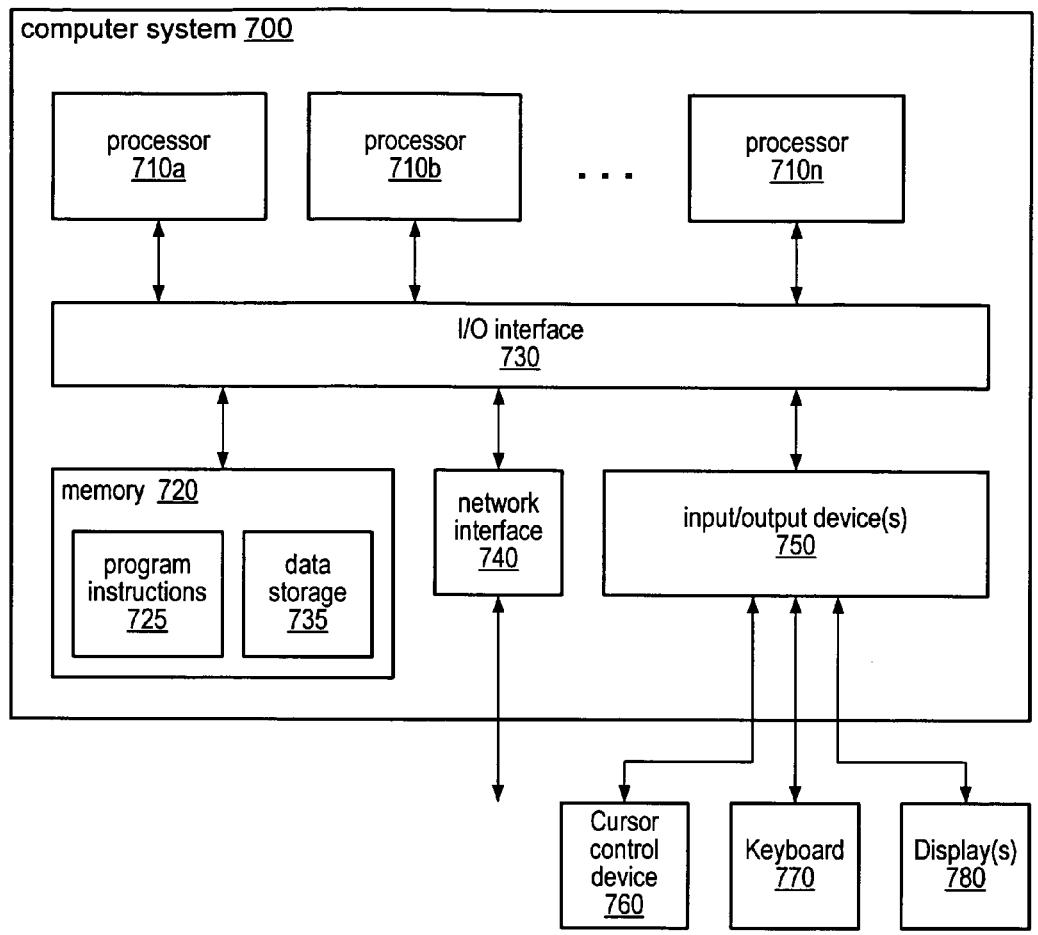
FIG. 8 illustrates an exemplary computer system on which embodiments may be implemented.

Various embodiments of a system and method for accessing and displaying previous tax return information in tax preparation software programs, as described herein, may be executed on one or more computer systems, which may interact with various other devices. One such computer system is illustrated by FIG. 8. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements (e.g., a current tax program and its data store) may be implemented via one or more nodes of computer system 700 that are distinct from those nodes implementing other elements (e.g., a previous version of the tax program and its data store).

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, configured to implement embodiments of a system and method for accessing and displaying previous tax return information in tax preparation software programs as described herein, and data storage 735, comprising various documents, tables, databases, etc. accessible by program instructions 725. In one embodiment, program instructions 725 may include the software elements illustrated in FIGS. 1, 2A and 2B (e.g., current tax program 200 and previous tax program 100) and data storage 736 may include the data illustrated in FIG. 1, 2A and 2B (previous tax return information 102 and possibly current tax document(s) 220 and previous tax document(s) 120, when and if stored to data storage 736). In other embodiments, different software elements and data may be included.

Those skilled in the art will appreciate that computer system 700 is merely illustrative and is not intended to limit the scope of the present invention. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising the steps of:
   opening, using a processor, a current financial return in a currently executing version of a financial return preparation executable software program (FRPP);
   receiving a request to display a source of a field upon selecting the field in the current financial return, wherein the field comprises a value obtained from a historical financial return for a non-current period;
   accessing, using the processor, a mapping between the value and a portion of the historical financial return comprising a source of the value;
   invoking, by using the mapping, execution of a historical version of the FRPP, with an instruction for displaying the source of the value, after accessing and in response to the request, wherein the current version of the FRPP and the historical version of the FRPP are different executable software programs, which are executing concurrently after invoking execution of the historical version by the current version of the FRPP; and
   displaying the source of the value within the portion of the historical financial return in a window of the historical version of the FRPP while concurrently displaying the current financial return in a window of the current version of the FRPP.

2. The method as recited in claim 1, wherein the current financial return is a tax return prepared for a governmental entity for a specified reporting period.

3. The method as recited in claim 1, further comprising:
   accessing a stored copy of the historical financial return from a current version of the FRPP in response to said selecting; and
   displaying at least a portion of the accessed stored copy of the historical financial return in the current version of the FRPP.

4. The method as recited in claim 1, further comprising:
   displaying a user interface element in response to said selecting a field in a current financial return, wherein the user interface element includes one or more user-selectable interface items each configured to, in response to user selection, display a portion of the historical financial return that includes a value that is a source value for the value displayed in the field of the current financial return; and
   displaying a portion of the electronic document from the historical financial return in response to user selection of one of the one or more user-selectable interface items.

5. The method as recited in claim 1, further comprising highlighting one or more fields of the displayed historical financial return that includes the one or more values that are source values for the value displayed in the selected field of the current financial return.

6. The method as recited in claim 1, further comprising displaying a calculation used for obtaining the value displayed in the selected field of the current financial return from the one or more values that are source values for the value displayed in the selected field of the current financial return.

7. A system, comprising:
   one or more processors;
   a display device; and
   a memory coupled to the one or more processors and the display device, wherein the memory comprises instructions executable by the one or more processors, the instructions comprising functionality for:
   a current version of a financial return preparation executable software program (FRPP) to:
   display a portion of a current financial return on the display device;
   receive a request to display a source of a field upon user input selecting the field of the current financial return, wherein the field comprises a value obtained from a historical financial return for a non-current period;
   access a mapping between the value and a portion of the historical financial return comprising a source of the value;
   invoke, by using the mapping, execution of a historical version of the FRPP with an instruction for displaying the source of the value, after accessing and in response to the request; and
   the historical version of the FRPP to:
   display, on the display device, the source of the value within the portion of the historical financial return, wherein the current version of the FRPP and the historical version of the FRPP are different executable software programs, which are executing concurrently after invoking execution of the historical version by the current version of the FRPP.

8. The system as recited in claim 7, wherein the current financial return is a tax return prepared for a governmental entity for a specified reporting period.

9. The system as recited in claim 7, wherein, to display a portion of a historical financial return on the display device, the program instructions are further executable by the one or more processors to:
   access a stored copy of the historical financial return from a current version of the FRPP in response to said user input; and
   display a portion of the accessed stored copy of the historical financial return in the current version of the FRPP on the display device.

10. The system as recited in claim 7, wherein the program instructions are further executable to:
    display on the display device a user interface element in response to said user input, wherein the user interface element includes one or more user-selectable interface items each configured to, in response to user selection, display the historical financial return that includes a value that is a source value for the value displayed in the field of the current financial return; and
    display on the display device a portion of the historical financial return in response to user selection of one of the one or more user-selectable interface items.

11. The system as recited in claim 7, wherein the program instructions are further executable to highlight one or more fields of the historical financial return that includes the one or more values that are source values for the value displayed in the selected field of the current financial return.

12. The system as recited in claim 7, wherein the program instructions are further executable to display on the display device a calculation used for obtaining the value displayed in the selected field of the current financial return from the one or more values that are source values for the value displayed in the selected field of the current financial return.

13. A computer-readable storage medium comprising program instructions stored thereon, wherein the program instructions comprise functionality to:
    open a current financial return in a currently executing version of a financial return preparation executable software program (FRPP);

receive a request to display a source of a field upon selecting a field in the current financial return, wherein the field comprises a value obtained from a historical financial return for a non-current period;

access a mapping between the value and a portion of the historical financial return comprising a source of the value;

invoke, by using the mapping, execution of a historical version of the FRPP with an instruction for displaying the source of the value, after accessing and in response to the request, wherein the current version of the FRPP and the historical version of the FRPP are different executable software programs, which are executing concurrently after invoking execution of the historical version by the current version of the FRPP; and display the source of the value within the portion of the historical financial return in a window of the historical version of the FRPP while concurrently displaying the current financial return in a window of the current version of the FRPP.

14. The computer-readable storage medium as recited in claim 13, wherein the current financial return is a tax return prepared for a governmental entity for a specified reporting period.

15. The computer-readable storage medium as recited in claim 13, wherein, in said displaying a portion of the historical financial return, the program instructions are further computer-executable to implement:

accessing a stored copy of the historical financial return from the current version of the FRPP in response to said selecting; and displaying a portion of the accessed stored copy of the historical financial return in the current version of the FRPP.

16. The computer-readable storage medium as recited in claim 13, wherein the program instructions are further computer-executable to implement:

displaying a user interface element in response to said selecting a field in the current financial return, wherein the user interface element includes one or more user-selectable interface items each configured to, in response to user selection, display a portion of the previous financial return that includes a value that is a source value for the value displayed in the field of the current financial return; and displaying a portion of the historical financial return in response to user selection of one of the one or more user-selectable interface items.

17. The computer-readable storage medium as recited in claim 13, wherein the program instructions are further computer-executable to implement highlighting one or more fields of the displayed historical financial return that include the one or more values that are source values for the value displayed in the selected field of the current financial return.

18. The computer-readable storage medium as recited in claim 13, wherein the program instructions are further computer-executable to implement displaying a calculation used for obtaining the value displayed in the selected field of the current financial return from the one or more values that are source values for the value displayed in the selected field of the current financial return.

* * * * *